Oct. 21, 1958  L. E. STONE, JR., ET AL  2,856,899
POULTRY FEEDER AND WATERER
Filed Sept. 14, 1956  2 Sheets-Sheet 1
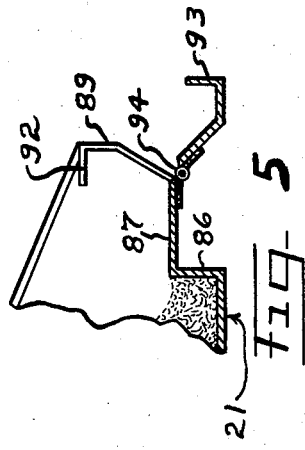
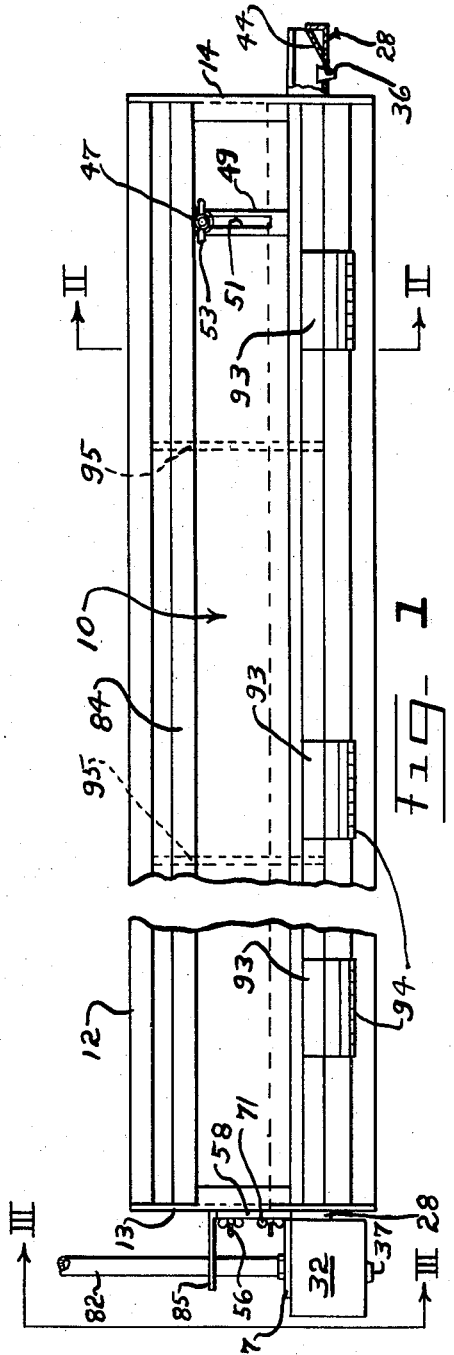
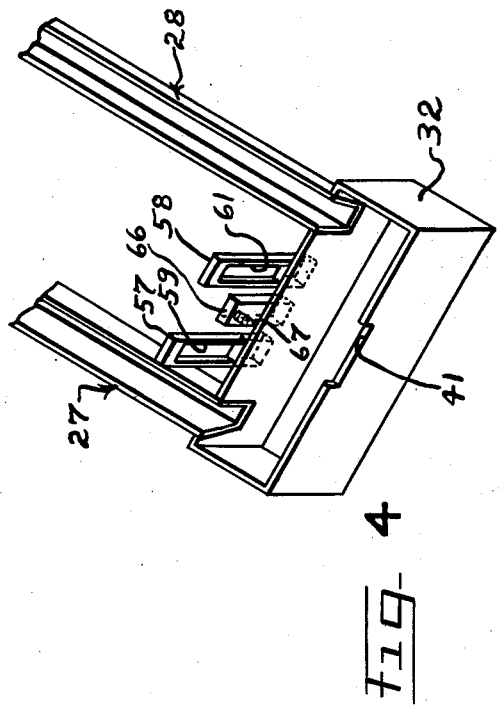
INVENTOR.
Luther E. Stone Jr.
Alan G. Diseker
BY
Jennings, Carter + Thompson
Attorneys

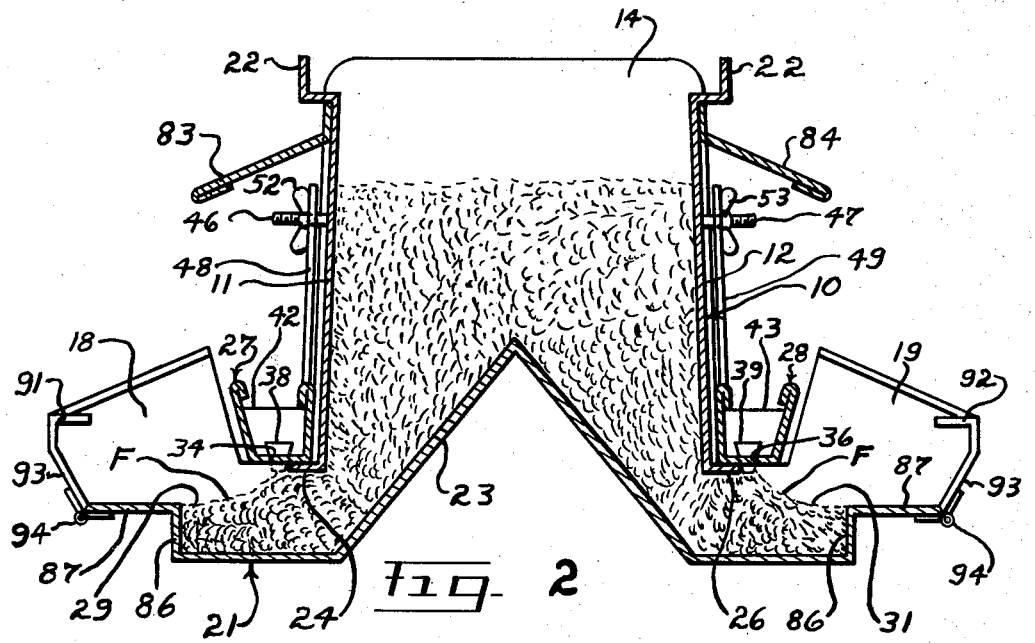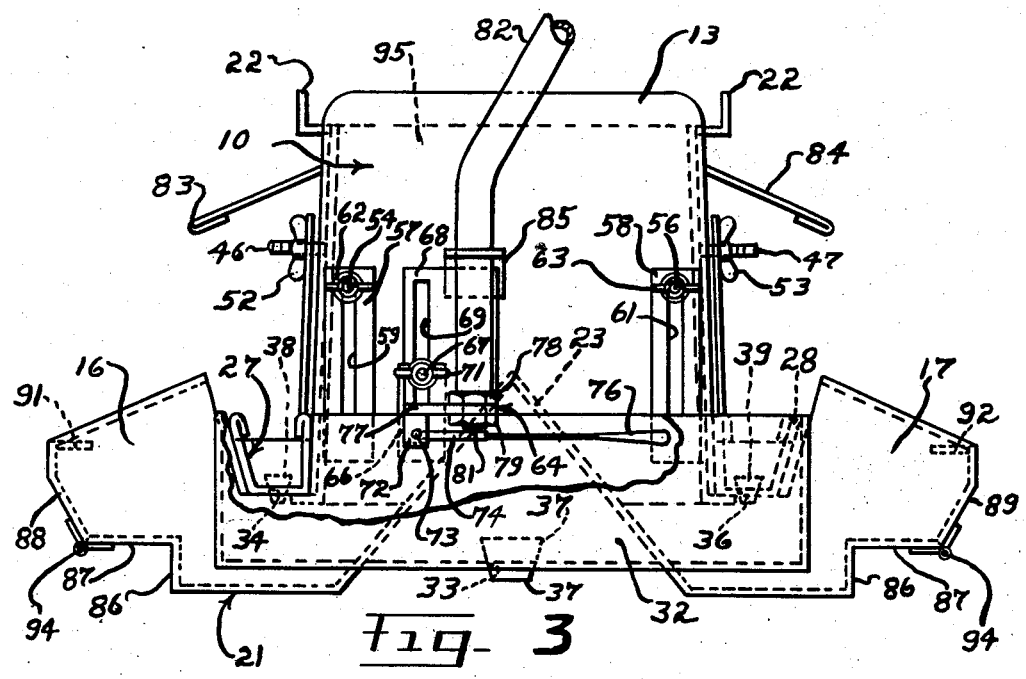

United States Patent Office 2,856,899
Patented Oct. 21, 1958

2,856,899

POULTRY FEEDER AND WATERER

Luther E. Stone, Jr., and Alan G. Diseker, Decatur, Ala.

Application September 14, 1956, Serial No. 610,015

9 Claims. (Cl. 119—51.5)

This invention relates to a poultry feeding and watering device and has for an object the provision of such a device in which the feed and water are both supplied at the same time in convenient reach of the birds regardless of the sizes thereof, thereby adapting the device for use with birds of various sizes.

A further object of our invention is to provide a poultry watering and feeding device of the character designated in which the water trough is supported for vertical adjustment above the inner portion of the feed trough and elongated elevated support members are provided in the feed trough outwardly of the water trough whereby small birds may eat or drink therefrom while larger birds stand on the outside of the device to eat and drink therefrom.

A further object of our invention is to provide a poultry feeding and watering device of the character designated in which means is provided for draining the water troughs outwardly of the feed trough, thereby preventing damage to the feed.

A still further object of our invention is to provide a poultry feeding and watering device of the character designated which shall be simple of construction, economical of manufacture and one which requires a minimum of labor to maintain a continuous supply of both feed and water for the device.

Briefly, our improved poultry feeding and watering device comprises an elongated feed hopper having a longitudinally extending feed trough positioned beneath the same and in communication therewith. The sides of the feed trough extend outwardly of and alongside the feed hopper and an inverted V-shaped ridge is provided in the bottom of the feed trough. Longitudinally extending water troughs are positioned alongside the feed hopper in position to define with the V-shaped ridge, restricted gravity feed passageways. An elevated, elongated support member is provided in the feed trough and is positioned outwardly of the water troughs whereby small birds standing on the support member are in easy reach of both the feed trough and the water trough.

Apparatus embodying features of our invention is illustrated in the accompanying drawings, forming a part of this application, in which:

Fig. 1 is a side elevational view, partly broken away and in section;

Fig. 2 is an enlarged sectional view taken generally along the line II—II of Fig. 1;

Fig. 3 is an enlarged end elevational view taken along the line III—III of Fig. 1;

Fig. 4 is a perspective view of the water supply tank showing the manner in which the water troughs are attached thereto; and, Fig. 5 is an enlarged detail sectional view of the outer portion of the feed trough.

Referring now to the drawings for a better understanding of our invention, we show an elongated feed hopper 10 having side walls 11 and 12 and end walls 13 and 14. The lower end of the end wall 13 extends outwardly as at 16 and 17 and the lower end of the end wall 14 extends outwardly as at 18 and 19 to provide end walls for a longitudinally extending feed trough indicated generally at 21. The upper ends of the feed hopper 10 extend outwardly and upwardly as at 22 to provide relatively sharp upper edges along the hopper, thereby preventing birds from standing thereon.

The bottom of the feed trough 21 is provided with an inverted V-shaped ridge 23 along the longitudinal center thereof, as shown in Figs. 2 and 3. The lower edges of the side walls 11 and 12 of the feed hopper are turned outwardly as at 24 and 26 to provide additional strength. Positioned along opposite sides of the hopper 10 are water troughs 27 and 28 which are supported on stirrups or brackets to be described hereinafter. When the water troughs are in lower position shown, birds cannot peck the feed at the point of exit thereof between the edges 24 and 26 and the bottom of the feed trough, thus preventing the discharge of excess feed by the pecking and pulling of the beaks of the birds. The bottoms of the water troughs 27 and 28 define with the inverted V-shaped ridge, restricted gravity feed passageways 29 and 31 which limit further the amount of feed, indicated at F, passing into the feed trough 21.

As shown in Fig. 1, the ends of the water troughs 27 and 28 extend outwardly of the ends 13 and 14 of the feed troughs. Secured to the ends of the water troughs 27 and 28 outwardly of the end wall 13 and forming a water tight joint therewith is a transverse water supply tank 32. A suitable drain opening 33 is provided in the bottom of the tank 32 and drain openings 34 and 36 are provided in the ends of the water troughs 27 and 28 outwardly of the wall 14, whereby the supply tank 32 and the water troughs may be drained outwardly of the feed troughs. Suitable stoppers 37, 38 and 39 are provided in the openings 33, 34 and 36, respectively. The water supply tank 32 is cut away as at 41 along one side thereof to provide an overflow passageway. Also, the upper portions of the end walls for the water troughs 27 and 28 positioned outwardly of the end wall 14 of the hopper are cut away as at 42 and 43 to provide overflow passageways whereby any excess water in the water troughs will overflow outwardly of the feed trough. To aid in cleaning the water troughs 27 and 28, the ends thereof outwardly of the end wall 14 are provided with inclined bottom portions 44, as shown in Fig. 1, whereby any foreign matter collected in the water trough may be easily raked over the inclined portions 44 and thence outwardly of the troughs.

Secured to the side walls 11 and 12 of the hopper 10 and projecting outwardly thereof are threaded members 46 and 47 respectively. Mounted on the water troughs 27 and 28 adjacent the end wall 14 are upstanding stirrups or brackets 48 and 49 having elongated, vertically extending slots 51 therein for receiving the threaded members 46 and 47. Suitable nuts, such as wing nuts 52 and 53 are provided on the threaded members 46 and 47 whereby the brackets 48 and 49 may be held in selected vertical positions. Projecting outwardly of the end wall 13 of the feed hopper are threaded members 54 and 56. Mounted on the water supply tank 32 adjacent the end wall 13 of the feed hopper are upstanding brackets 57 and 58 having elongated vertical slots 59 and 61 therein, respectively, for receiving the threaded members 54 and 56. Suitable nuts 62 and 63 are provided on the threaded members 54 and 56 for holding the brackets 57 and 58 in selected vertical positions.

To maintain a predetermined level of the water in the supply tank 32 and the water troughs 27 and 28, we provide a float actuated valve indicated generally at 64. Mounted on the supply tank 32 between the upstanding brackets 57 and 58 is an upstanding bracket 66 having an outwardly projecting threaded member 67 adjacent the upper end thereof. Mounted for vertical and angular adjustment relative to the threaded member 67 is an upstanding bracket 68 having an elongated vertically extending slot 69 therein for receiving the threaded member 67. A suitable nut 71 is provided on the threaded member 67 whereby the bracket 68 is held in selected vertical and angular positions relative to the bracket 66. Secured to the undersurface of the bracket 68 is a U-shaped bracket 72 having depending legs. Pivotally connected to the depending legs of the bracket 72 by means of a pivot pin 73 is an arm 74 having a float member 76 at the free end thereof. As shown in Fig. 3, the bracket 68 is provided with a horizontal leg 77 adjacent the lower end thereof. A suitable opening is provided in the horizontal leg 77 for receiving the float actuated valve 64, as shown in Fig. 3. The valve 64 is secured to the leg 77 by lock nuts 78 and 79. The valve 64 is provided with a depending actuating stem 81 which is in position to be engaged by the arm 74 as it moves about its pivot pin 73, thereby maintaining the proper water level in the tank 32. A water supply conduit 82 is connected to the upper end of the valve 64 for supplying water thereto. To prevent accidental movement of the conduit 82, we mount a bracket 85 on the end wall 13. The bracket 85 is provided with a suitable opening for receiving the conduit 82, as shown. To prevent feed from falling into the water troughs 27 and 28 as the feed hopper 10 is filled, we provide outwardly and downwardly extending shields 83 and 84 adjacent the upper edges of the side walls 11 and 12, as shown. Any feed falling outwardly of the hopper 10 is thus deflected outwardly of the water troughs 27 and 28.

As shown in Figs. 2, 3 and 5, the bottom of the feed trough 21 is turned upwardly as at 86 and then outwardly as at 87 to provide longitudinally extending elevated portions upon which small birds may stand whereby they are in easy reach of the water trough and the feed F. The feed trough 21 is provided with outwardly and upwardly extending side walls 88 and 89 which are joined to the elongated, elevated members 87. Preferably, the upper edges of the side walls 88 and 89 are turned inwardly as at 91 and 92 to add strength thereto. In order to start small birds eating from the feed trough, we provide a plurality of hinged flaps 93 along the side walls 88 and 89 of the feed trough. The flaps 93 are hingedly connected to the feed trough by suitable hinges 94.

To add strength to the device, suitable longitudinally spaced vertical plates 95 may be mounted in the hopper 10.

From the foregoing description, the operation of our improved poultry feeding and watering device will be readily understood. The feed is placed in the feed hopper 10 whereby it flows by gravity downwardly betwen the V-shaped ridge 23 and the bottom of the water troughs 27 and 28 and reaches a point adjacent the inner edge of the elevated members 87, as shown in Fig. 2. For small birds, the brackets 48, 49, 57 and 58, are secured in place in their lowermost positions whereby the water troughs are in easy reach of small birds. As the birds increase in size, the water troughs are raised to accommodate the height of the birds. The elevation of the water supply tank 32 and the water troughs is adjusted by moving the brackets 48, 49, 57 and 58 to the desired location and then locking them in place by means of the nuts 52, 53, 62 and 63. To determine the level of the water in the tank 32 and the water trough, the nut 71 is loosened whereby the vertical position of the arm 74 may be adjusted, thus locating the approximate position of the float 76. To make a final adjustment of the position of the float 76, the bracket 68 may be turned angularly about the threaded member 67 whereby an exact, predetermined level of water may be maintained in the supply tank and the water troughs in communication therewith. To clean the supply tank and water troughs, the stoppers 37, 38 and 39 are removed from their respective openings and the tank and troughs are flushed out. The water troughs are then cleaned by suitable means, such as a brush, by brushing the foreign matter therein out over the inclined portions 44.

From the foregoing it will be seen that we have devised an improved poultry feeding and watering device which places the food and water in easy reach of the birds. Also, by providing an elongated, elevated support for the small birds, our device is particularly adapted for use with various sizes of birds at the same time. Also, by providing means for adjusting the vertical position of the water troughs, the troughs may be readily adjusted to accommodate the height of the birds. Furthermore, the level of the water in the water troughs may be accurately and easily adjusted by merely moving the bracket 68 vertically relative to its support and then moving the same angularly relative to its support to provide final adjustment.

While we have shown my invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. A poultry feeding and watering device comprising an elongated feed hopper, a feed trough extending longitudinally beneath and in communication with said hopper with the sides of said feed trough extending alongside and outwardly of said hopper, an inverted V-shaped ridge in the bottom of said feed trough along the longitudinal center thereof, a longitudinally extending water trough positioned alongside and outwardly of said hopper, and an upturned edge along the feed trough outwardly of said water trough and terminating in outwardly extending horizontal elevated members to impede outward flow of feed and provide a relatively flat perch for small birds.

2. A poultry feeding and watering device comprising an elongated feed hopper, an elongated feed trough extending longitudinally beneath and in communication with said hopper with the sides of said feed trough positioned outwardly of said hopper, an inverted V-shaped ridge in the bottom of said feed trough along the longitudinal center thereof, elongated water troughs extending alongside and outwardly of said hopper, vertically adjustable means connecting said water troughs to said hopper whereby the elevation of said troughs relative to said hopper may be varied, and longitudinally extending elevated support members in said feed trough outwardly of said water troughs, the upper surface of said support members being relatively flat and extending in a generally horizontal plane.

3. A poultry feeding and watering device comprising an elongated feed hopper, a feed trough extending longitudinally beneath and in communication with said hopper with the sides of said feed trough positioned outwardly of said hopper, an inverted V-shaped ridge in the bottom of said trough along the longitudinal center thereof, longitudinally extending water troughs positioned along each side and outwardly of the lower portion of said hopper, the water troughs and the lower portion of the hopper being spaced from said V-shaped ridge and defining restricted gravity feed passageways therebetween, longitudinally extending elevated portions in said feed trough outwardly of said water troughs defining perches for small birds, the upper surface of said elevated portions being relatively flat and extending in generally horizontal planes, a water supply tank mounted for vertical adjustment outwardly of one end of said feed trough and communicating with said water troughs, means supplying water to said tank, and means maintaining a predetermined level of water in said tank and water troughs.

4. A poultry feeding and watering device comprising an elongated feed hopper, a feed trough extending longitudinally beneath and in communication with said hopper with the sides of said feed trough positioned outwardly of said hopper, an inverted V-shaped ridge in the bottom of said trough along the longitudinal center thereof, longitudinally extending water troughs positioned along each side and outwardly of the lower portion of said hopper, the water troughs and the lower portion of the hopper being spaced from said V-shaped ridge and defining restricted gravity feed passageways therebetween, longitudinally extending elevated portions in said feed trough outwardly of said water troughs defining perches for small birds, the upper surface of said elevated portions being relatively flat and extending in generally horizontal planes, a water supply tank mounted for vertical adjustment outwardly of one end of said feed trough and communicating with the adjacent ends of said water troughs, means supplying water to said tank, means maintaining a predetermined level of water in said tank and water troughs, and vertically adjustable means carried by said hopper and supporting the ends of said water troughs opposite said tank.

5. Apparatus as defined in claim 4 in which the means supporting the ends of the water troughs opposite the supply tank comprises upstanding brackets secured to the water troughs adjacent said ends, there being elongated vertical openings in said brackets, outwardly projecting threaded members on the sides of the feed hopper disposed to enter said openings, and nuts on said threaded members locking said brackets in selected positions.

6. A poultry feeding and watering device as defined in claim 4 in which the means maintaining a predetermined level of water in the supply tank comprises a float actuated valve in said tank, and vertically adjustable means supporting said valve from the supply tank.

7. A device as defined in claim 6 in which the vertically adjustable means comprises a threaded member secured to the tank and projecting outwardly thereof, an upstanding bracket secured to said valve, there being an elongated vertically extending opening in said bracket disposed to receive said threaded member, and a nut on said threaded member holding said bracket in selected vertical and angular positions.

8. A poultry feeding device comprising a longitudinally extending feed hopper, a feed trough positioned beneath said hopper and in communication with said hopper with lateral portions of said feed trough extending outwardly from the sides of the hopper, an inverted longitudinal V-shaped ridge extending upwardly from the central portion of said feed trough into said hopper, and an elevated support member on each side of the feed trough spaced outwardly of the hopper, each support member having a vertical member to impede the outward flow of feed from the feed trough and a generally horizontal flat member extending outwardly from the upper end of said vertical member adapted to form a perch for small birds.

9. A poultry feeding device as defined in claim 8 in which a side wall extends upwardly from the generally horizontal flat member and has hinged flaps spaced longitudinally therein adapted to be folded away from the side wall to form access openings to the perch.

References Cited in the file of this patent
UNITED STATES PATENTS

| | | |
|---|---|---|
| 1,463,862 | Wolf | Aug. 7, 1923 |
| 1,527,360 | Harless | Feb. 24, 1925 |
| 1,862,217 | Gay et al. | June 7, 1932 |
| 2,195,575 | Mallgraf | Apr. 2, 1940 |
| 2,230,058 | Hornung | Jan. 28, 1941 |
| 2,527,324 | Muehlfeld | Oct. 24, 1950 |
| 2,749,881 | Gustafson | June 12, 1956 |